W. T. CLAYCOMB.
CRATE AND PROTECTOR.
APPLICATION FILED FEB. 20, 1909.
936,984.
Patented Oct. 12, 1909.
4 SHEETS—SHEET 1.
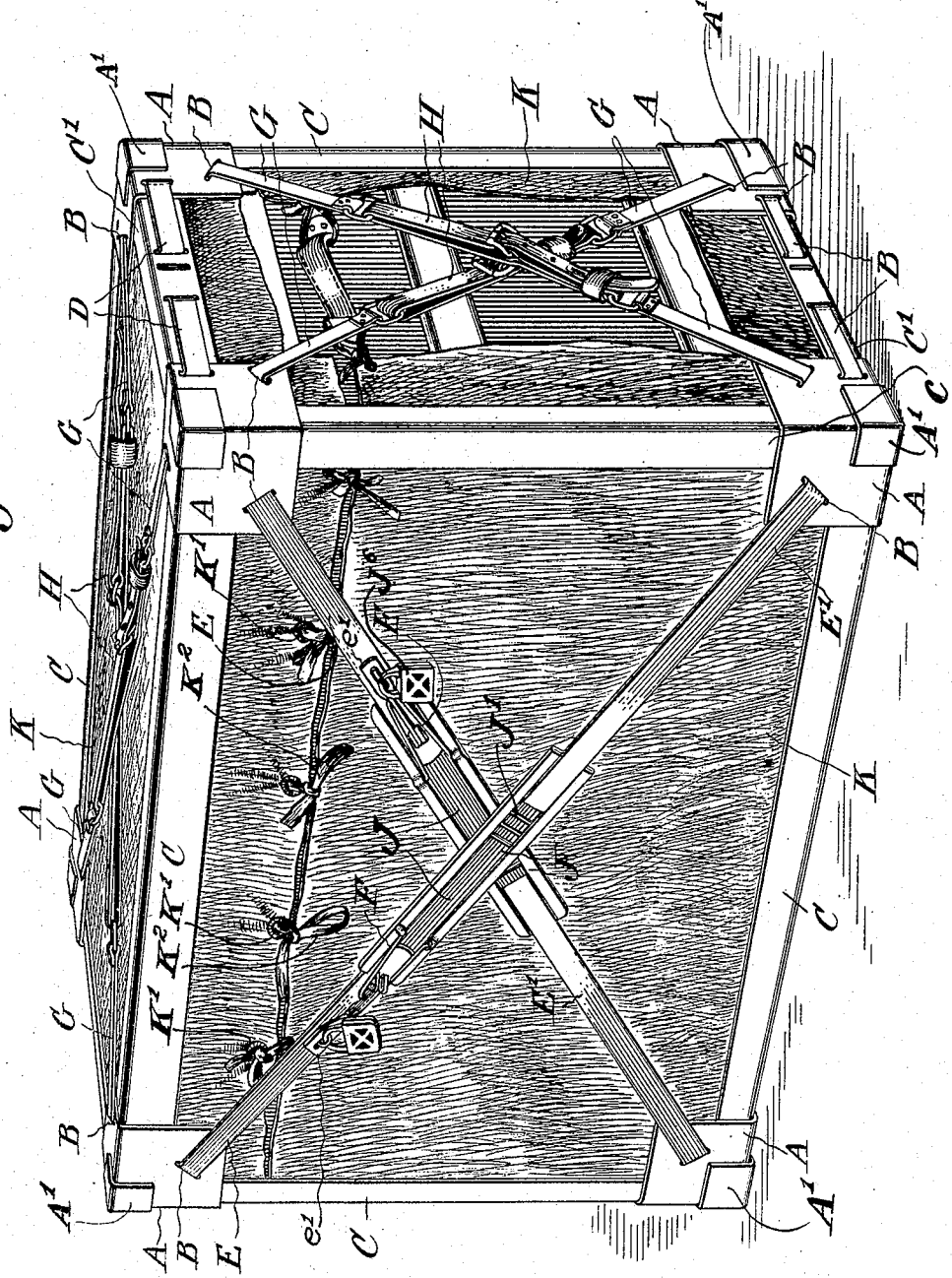
Witnesses:
Geo. C. Murphy.
Clarence W. Kimberlin
Inventor:
William T. Claycomb

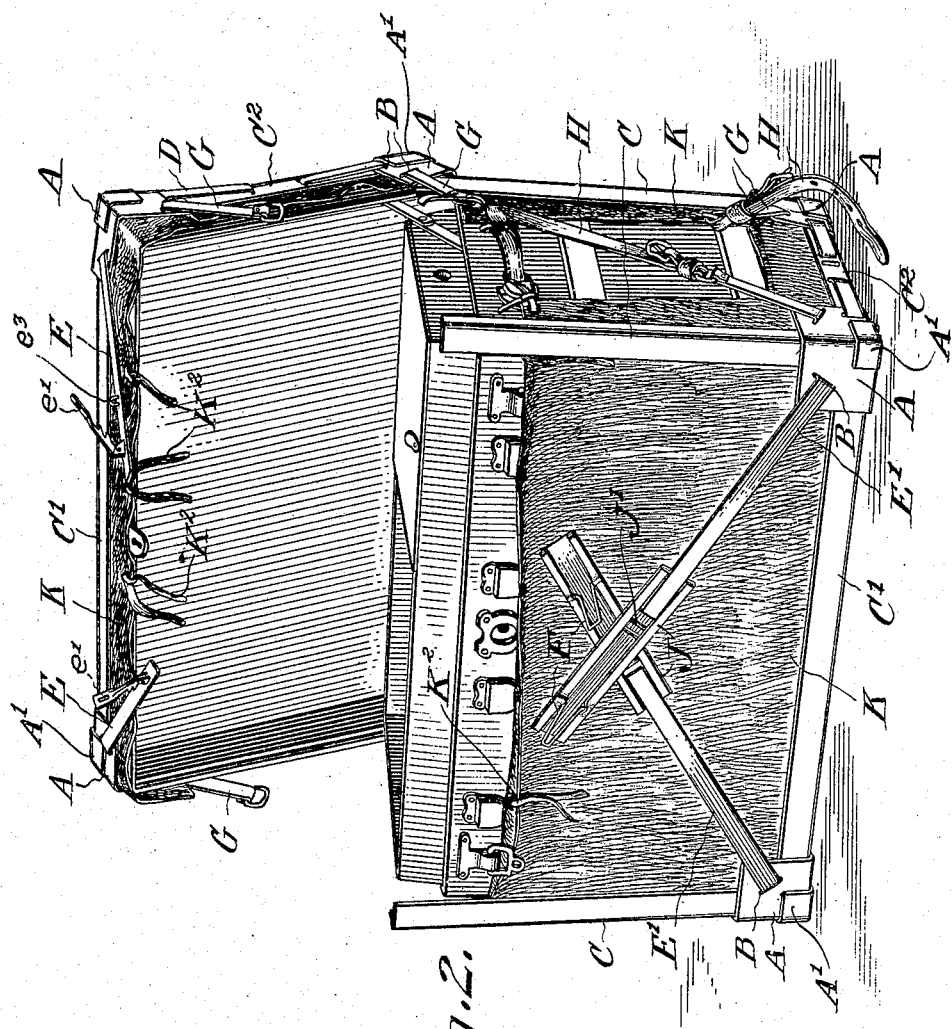

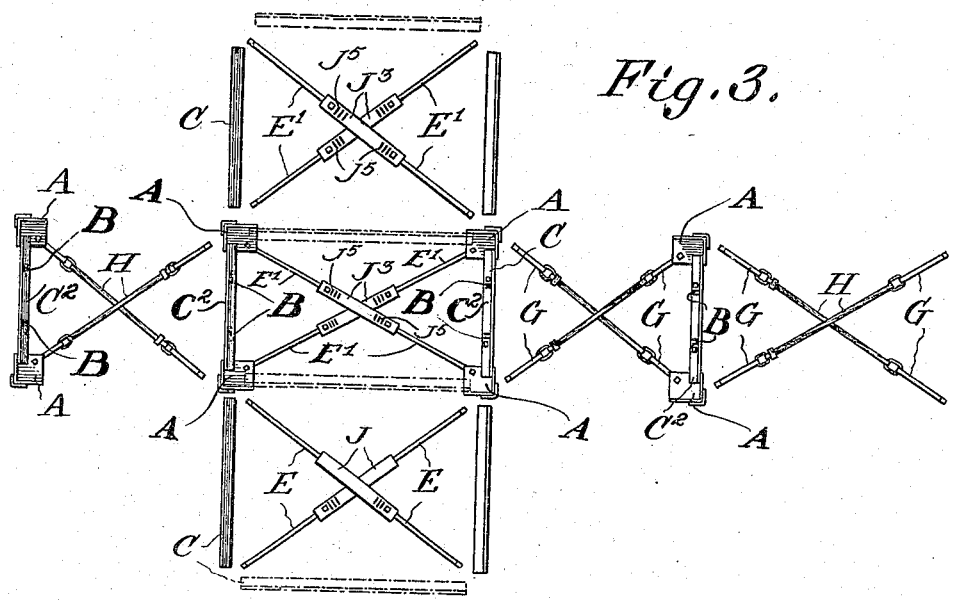
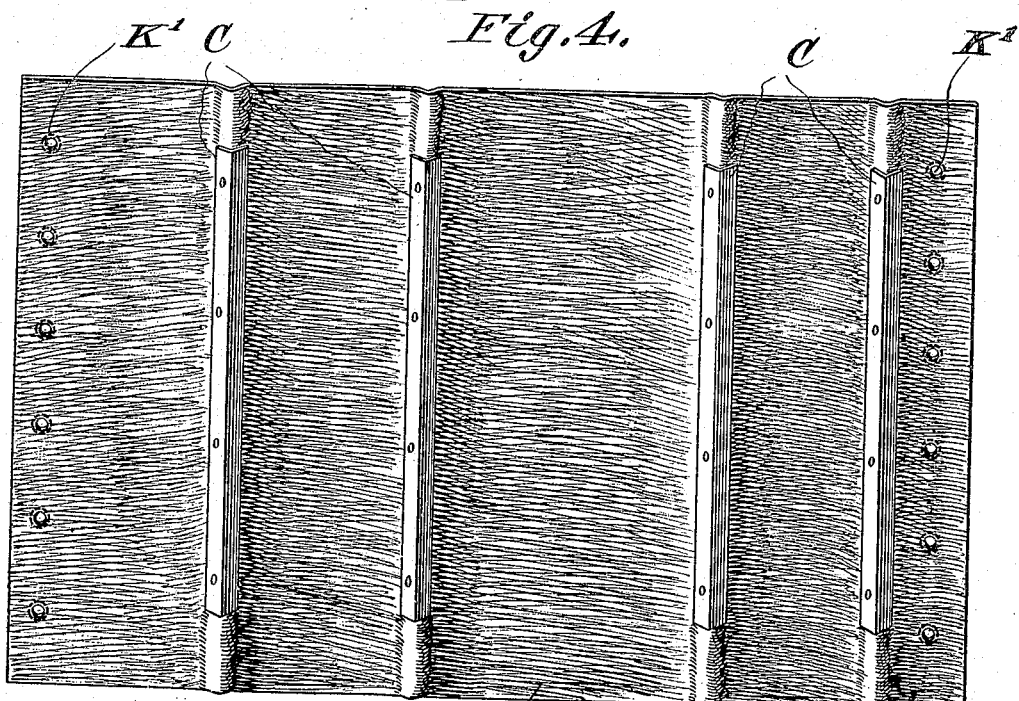

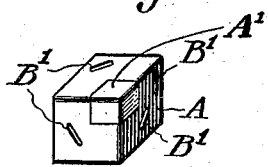
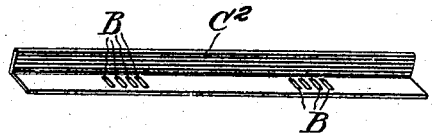
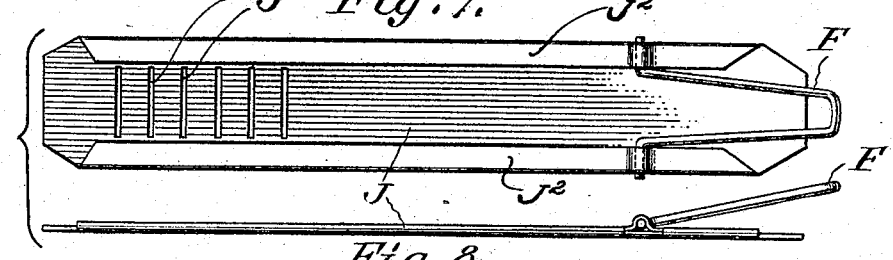
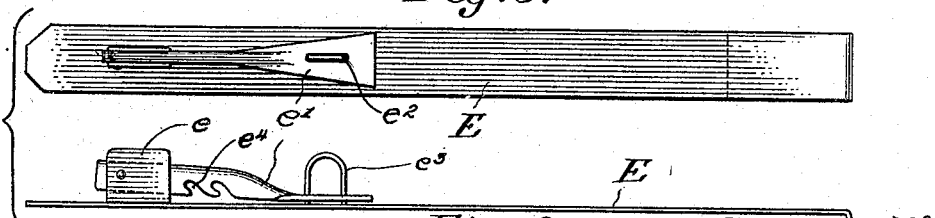
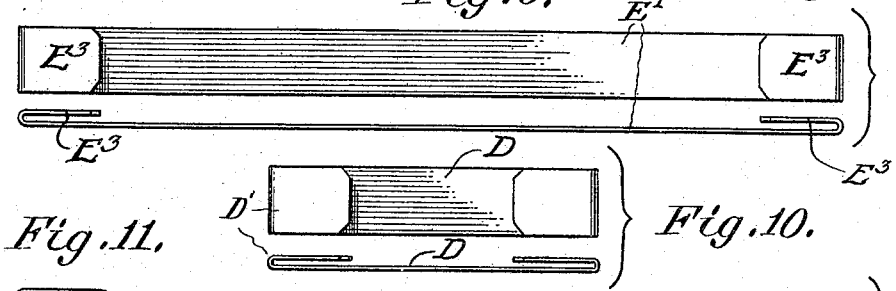
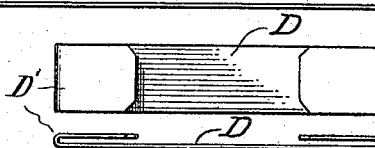
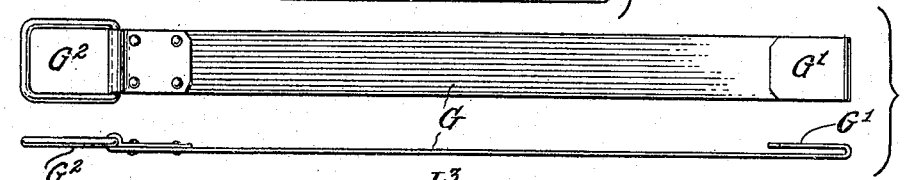
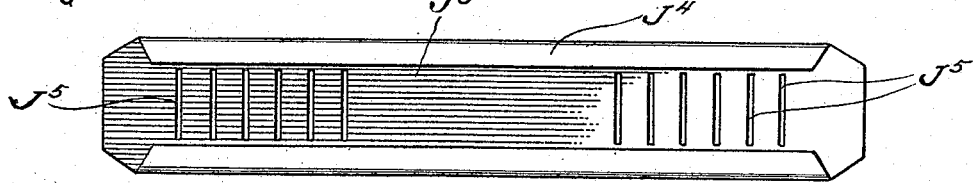

UNITED STATES PATENT OFFICE.

WILLIAM T. CLAYCOMB, OF OWENSBORO, KENTUCKY.

CRATE AND PROTECTOR.

936,984.  Specification of Letters Patent.  Patented Oct. 12, 1909.

Application filed February 20, 1909. Serial No. 479,191.

*To all whom it may concern:*

Be it known that I, WILLIAM T. CLAYCOMB, a citizen of the United States, residing at 1006 West Third street, in the city of Owensboro, county of Daviess, State of Kentucky, have invented certain new and useful Improvements in Crates and Protectors, of which the following is a specification.

This invention relates to combined shipping crates and protectors especially adapted for use in connection with trunks and similar baggage, and the principal object of the same is to provide a device of the character specified which may be adjusted for various sizes of trunks, and which will thoroughly protect the same from injury incidental to rough handling while being transported.

Another object is to provide a crate and protector which may be readily attached to or detached from a trunk, and which may be locked in position thereon so as to prevent unauthorized access being had to the interior of the trunk, but which will permit authorized opening of the trunk without the necessity of the crate and protector being removed therefrom.

In carrying out the objects of the invention generally stated above, it will, of course, be understood that the same is susceptible of changes in details and structural arrangements, one preferred and practical embodiment of which is shown in the accompanying drawings, wherein—

Figure 1 is a perspective view of a trunk equipped with the improved crate. Fig. 2 is a similar view, the lid or cover of the trunk being raised. Fig. 3 is a detail plan view of the crate removed from a trunk. Fig. 4 is a similar view of a trunk covering used in connection with the improved crate. Fig. 5 is a detail perspective view of one of the corner boxes of the crate. Fig. 6 is a similar view of one of the edge protectors. Fig. 7 represents a plan and side view of one of the locking members for the front of the crate. Fig. 8 is a similar plan and side view of one of the other locking members for the front of the crate. Fig. 9 is a similar view of the connecting members for the crate. Fig. 10 is a similar view of one of the connecting hooks for the ends of the crate. Fig. 11 is also a similar view of another connecting hook for the ends of the crate. Fig. 12 is a plan view of one of the connecting plates used at the bottom and rear of the crate.

Referring to said drawings by numerals, 1 designates a trunk and 2 the hinged cover thereof. The trunk shown is of a conventional type, being of the usual rectangular shape.

The improved crate and protector is composed of an inclosing cover or jacket K which is provided with eyelets K' adjacent each end edge, and is also provided with spaced apart angle irons C which engage over the horizontal corners of the trunk, said angle irons C being of less length than the width of the cover, so that the edges of the cover may be looped over the trunk and secured together by suitable lacings or other fastening devices $K^2$ to hold said cover about a trunk as shown in Fig. 1. After the cover is secured about the trunk, angle irons $C^1$ are placed over the horizontal side edges of the trunk, and the horizontal end corners are also provided with angle irons $C^2$, said angle irons $C^2$ being provided with a plurality of transversely arranged slots B. Said angle irons $C^1$ and $C^2$ (hereinafter termed edge protectors) meet at the corners of the trunk and are held in position by means of angle caps A which fit over said corners, said caps being provided with slots $B^1$ adjacent its edges. Plates D, the ends of which are provided with hooks $D^1$, are adapted for engagement with one of the slots of said caps and one of the slots of the end edge protector $C^2$ to hold the parts in adjustable and detachable relation.

The front of the crate is formed by the diagonal plates E and $E^1$. The plate E has a hook-shaped end $E^2$ which engages with one of the slots of the caps A. The free ends of said plates E carry a pivot ear $e$ upon which a hasp $e^1$ is pivotally mounted, the free end of said hasp being flattened and provided with a slot $e^2$ which is adapted for engagement with a staple $e^3$. The inner intermediate edge of the body of said hasp is provided with holding notches $e^4$. The plates E as shown project from the upper corners of the trunk and the plates $E^1$ project from the lower corners thereof, said plates radiating toward the center. The plates $E^1$ have hoops $E^3$ at each end adapted respectively for engagement with the slots of their caps A and with the slots $J^1$ of a locking member J. Said locking member has its longitudinal edges $J^2$ turned in to form guide slots for the edges of the plates $E—E^1$. A bail F is pivotally mounted on each member J. The bails are adapted for hook engagement with the notches $e^4$ of the hasps $e^1$, after which the hasps are rocked on their pivots to engage with the staples $e^3$ and be locked in such position by the locks $J^3$.

The corner caps A are preferably provided with corner shields $A^1$ to serve as a protector for the same.

The plates, locking members, edge protectors and corner caps described are preferably formed of sheet metal, which may be punched and shaped by a suitable machine at a single operation, as will be obvious, thus materially cheapening the cost of production.

The top and ends of the crate may be held in rigid but detachable relation to the trunk by means of the sheet metal plates G having a hook-shaped end $G^1$ which engages with the slots of the caps A. Said plates are diagonally arranged and at their inner ends are provided with rings $G^2$, the ring of each diagonally opposite plate being adjustably connected by means of the straps H.

The bottom and the rear of the crate are of duplicate construction, the corner plates $E^1$ which radiate toward the center being similar in all respects with the plate $E^1$ at the front of the plate, the outer end of each plate being in hooked engagement with the corner caps and the inner ends of said plates being adjustably engaged with the transverse slots $J^5$ of the connecting members or plates $J^3$. Said connecting members $J^3$ are arranged in crossing relation as shown in Fig. 3 of the accompanying drawings, and one of the same is shown in detail in Fig. 12. Referring to said Fig. 12, it will be observed that said members have their longitudinal edges inturned to provide guiding grooves $J^4$ for the hooked inner ends of the plates $E^1$.

It will be seen from the foregoing that the present invention provides for a thorough protection of all edges of a trunk or other article of baggage, and also provides a cover for the trunk thereby preventing injury to the same. And it will also be seen that through the described slot and hook connection of the various parts of the crate, the same may be adjusted to fit trunks of various sizes.

Another prominent feature of the invention is in the described manner of locking the front members of the crate at the sides of the trunk, by means of which the crate and trunk are securely fastened against unauthorized opening of the same, yet the same may be readily opened by means of a key fitting the locks of the members E, so that the crate and trunk may be opened as is indicated in Fig. 2.

What I claim as my invention is:—

1. A protector for trunks and the like, comprising a cover, edge protectors carried by said cover and fitting the horizontal edges of a trunk, protectors for the edges of a trunk and fitting over the cover, corner caps fitting over the edge protectors, and adjustable braces for holding said caps to said corners.

2. A protector for trunks and the like, comprising a cover, protectors carried by said cover for engagement with edges of a trunk, and a crate for holding said cover about a trunk.

3. A protector for trunks and the like, comprising a cover, edge protectors carried thereby, corner caps for holding said protector to a trunk, edge protectors also held in position by said caps, and braces for holding said caps in position.

4. A crate for trunks and the like, comprising edge protectors, caps for the meeting ends of said protectors and provided with slots, braces having a hook connection with the slots of said caps, and adjustable connecting members for said braces.

5. A crate for trunks and the like, comprising horizontal and vertical edge protectors, corner caps for the meeting ends of said protectors, said caps being provided with slots, diagonally arranged braces having a hook connection with the slots of said caps, and adjustable and detachable connecting members for said braces.

6. A crate for trunks and the like, comprising horizontal and vertical edge protectors, corner caps for the meeting ends of said protectors, hooks for holding said caps in adjustable relation with some of said horizontal protectors, and adjustable and detachable braces connecting said caps.

7. A crate for trunks and the like, comprising vertical and horizontal edge protectors, corner caps for the meeting ends of said protectors, means for bracing the ends of said crate, braces extending diagonally from said caps at the sides of the crate, a connecting member for said braces, and means for locking the braces of the front of the crate to their connecting members.

8. A device of the character described comprising a cover for a trunk, angle irons carried by said cover for engaging over the edge of a trunk, and means for detachably retaining said cover in a trunk-covering position.

WILLIAM T. CLAYCOMB.

Witnesses:
T. F. BIRKHEAD,
J. H. MATTINGLY.